(12) United States Patent
Engelhardt

(10) Patent No.: US 8,686,702 B2
(45) Date of Patent: Apr. 1, 2014

(54) NEGATIVE SLOPE COMPENSATION FOR CURRENT MODE SWITCHING POWER SUPPLY

(75) Inventor: Michael Thomas Engelhardt, Sunnyvale, CA (US)

(73) Assignee: Linear Technology Corporation, Milpitas, CA (US)

( * ) Notice: Subject to any disclaimer, the term of this patent is extended or adjusted under 35 U.S.C. 154(b) by 178 days.

(21) Appl. No.: 13/397,370

(22) Filed: Feb. 15, 2012

(65) Prior Publication Data

US 2013/0207629 A1  Aug. 15, 2013

(51) Int. Cl.
G05F 1/56  (2006.01)

(52) U.S. Cl.
USPC ........................................ 323/282; 323/284

(58) Field of Classification Search
USPC .................................. 323/282–286
See application file for complete search history.

(56) References Cited

U.S. PATENT DOCUMENTS

| | | | |
|---|---|---|---|
| 6,101,106 A * | 8/2000 | Shi ................................. | 363/41 |
| 6,498,466 B1 | 12/2002 | Edwards | |
| 6,930,520 B2 * | 8/2005 | Solie ............................. | 327/131 |
| 7,615,978 B2 * | 11/2009 | Guo .............................. | 323/282 |
| 8,159,204 B2 * | 4/2012 | Grant ........................... | 323/285 |
| 8,294,447 B2 * | 10/2012 | Xie ............................... | 323/299 |
| 8,305,055 B2 * | 11/2012 | Wu et al. ...................... | 323/259 |
| 8,310,221 B2 * | 11/2012 | Herzer et al. ................ | 323/283 |
| 8,415,933 B2 * | 4/2013 | Loikkanen et al. ........... | 323/225 |
| 8,441,813 B2 * | 5/2013 | Tan et al. ...................... | 363/21.03 |
| 8,519,691 B2 * | 8/2013 | McCloy-Stevens .......... | 323/284 |
| 8,541,993 B2 * | 9/2013 | Notman et al. ............... | 323/271 |
| 2006/0043951 A1 | 3/2006 | Oswald et al. | |
| 2007/0013355 A1 | 1/2007 | Liao | |
| 2007/0296389 A1 | 12/2007 | Chen et al. | |
| 2009/0309557 A1 | 12/2009 | Miyamae | |
| 2010/0253313 A1 | 10/2010 | Herzer et al. | |

OTHER PUBLICATIONS

International Search Report for Application No. PCT/US2013/026156 dated Apr. 12, 2013.

* cited by examiner

*Primary Examiner* — Adolf Berhane
*Assistant Examiner* — Nusrat Quddus
(74) *Attorney, Agent, or Firm* — McDermott Will & Emery LLP

(57) ABSTRACT

Generated are an error signal representative of a difference between a signal representative of the output voltage of a current mode switching power supply and a reference voltage, and a peak current threshold signal that is indicative of a peak current that should be reached in an inductor within the power supply during each cycle of a periodic clock signal and that has a level that is based on the error signal. A switch control signal regulates the voltage output of the power supply by closing and then opening a power switch during each cycle of the periodic clock signal. Timing of opening is based on the peak current threshold signal. Negative slope compensation causes the switch control circuit to delay opening the power switch during each cycle of the periodic clock signal in an amount that decreases with increasing duty cycles of the switch control signal.

22 Claims, 5 Drawing Sheets

US 8,686,702 B2

NEGATIVE SLOPE COMPENSATION FOR CURRENT MODE SWITCHING POWER SUPPLY

BACKGROUND

1. Technical Field

This disclosure relates to current mode switching power supplies and to controllers that regulate them.

2. Description of Related Art

Switching power supplies may control their output with a constant frequency switching signal that is periodically turned off when current in an output stage reaches a threshold level. Positive slope compensation is sometimes added to prevent undesirable sub-harmonic oscillation when operating at switch signal duty cycles above 50%.

However, positive slope compensation can reduce the output impedance of the switching stage averaged over each switching cycle. This may cause the output inductor to introduce a phase shift in the feedback loop. In turn, this may reduce the phase margin of the feedback loop which may lead to poor transient response or even feedback loop instability.

SUMMARY

A controller may be configured to control a current mode switching power supply that uses at least one power switch and an inductor to generate an output voltage. The controller may include a clock circuit, an error amplifier, a peak current threshold circuit, a switch control circuit, and a slope compensation circuit.

The clock circuit may be configured to generate a periodic clock signal.

The error amplifier may be configured to generate an error signal that is representative of a difference between a signal representative of the output voltage and a reference voltage.

The peak current threshold circuit may be configured to generate a peak current threshold signal indicative of a peak current that should be reached in the inductor during each cycle of the periodic clock signal that has a level that is based on the error signal.

The switch control circuit may be configured to generate a switch control signal that is configured to regulate the voltage output by closing and then opening the at least one power switch during each cycle of the periodic clock signal. The timing of the opening may be based on the peak current threshold signal.

The slope compensation circuit may be configured to provide negative slope compensation that causes the switch control circuit to delay opening the at least one power switch during each cycle of the periodic clock signal in an amount that decreases with increasing duty cycles of the switch control signal. This negative slope compensation may be provided only when the duty cycle of the switch control signal is below a threshold, such as 50%.

The slope compensation circuit may be configured to provide positive slope compensation when the duty cycle is greater than the threshold that causes the switch control circuit to delay opening the at least one power switch during each cycle of the periodic clock signal in an amount that increases with increasing duty cycles of the switch control signal.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
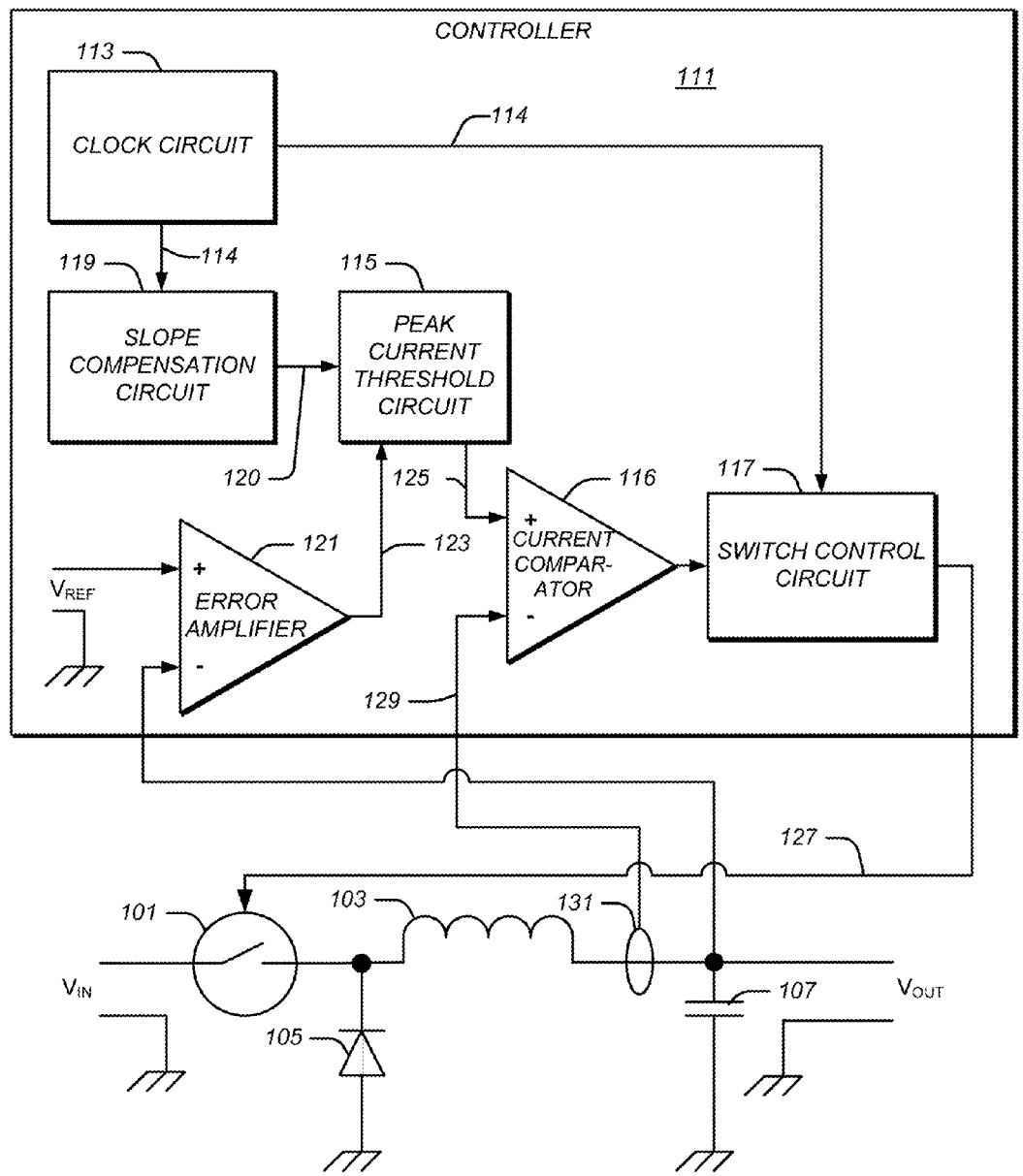
FIG. 1 illustrates an example of a current mode switching power supply with negative slope compensation.

FIG. 1 illustrates an example of a current mode switching power supply with negative slope compensation. As illustrated in FIG. 1, the current mode switching power supply may include at least one power switch 101, an inductor 103, a rectifier 105, a filter capacitance 107, a current sensor 131, and a controller 111. The controller 111 may include a clock circuit 113, a peak current threshold circuit 115, a current comparator 116, a switch control circuit 117, a slope compensation circuit 119, and an error amplifier 121.

The at least one power switch 101 may be of any type. For example, it may consist of or include one or more transistors.

The clock circuit 113 may be configured to generate a periodic clock signal 114. Its frequency may be any fixed amount. For example, its frequency may be fixed at anywhere within the range of 17 kHz to 25 Mhz.

The error amplifier 121 may be configured to detect an error between an output voltage $V_{OUT}$ of the current mode switching power supply and a voltage reference signal $V_{REF}$. This error may be presented by the error amplifier 121 as an error signal 123. The full output voltage $V_{OUT}$ from the power supply is illustrated as being connected to the error amplifier 121. However, a scaled version of this output voltage may be provided instead, in which case $V_{REF}$ may similarly be scaled. The error amplifier 121 may be configured to generate an error signal based on a difference between the output voltage $V_{OUT}$ (or a scaled version thereof) and the reference voltage $V_{REF}$. The error amplifier 121 may be an analog error amplifier, such as an operational amplifier or a transconductance amplifier.

The peak current threshold circuit 115 may be configured to generate a peak current threshold signal 125 that is indicative of a peak current that should be reached in the inductor 103 during each cycle of the periodic clock signal in order to cause the output voltage $V_{OUT}$ (or a scaled version thereof) to be equal to the reference voltage $V_{REF}$. The level of this peak current threshold signal 125 may be based on the error signal 123 from the error amplifier 121. For example, if the error signal 123 indicates that the output voltage $V_{OUT}$ is too low, the peak current threshold circuit 115 may increase the value of the peak current threshold signal 125. Conversely, if the error signal 123 indicates that the output voltage $V_{OUT}$ is too high, the peak current threshold circuit 115 may decrease the value of the peak current threshold signal 125.

The current comparator 116 may be configured to compare the peak current threshold signal 125 with the output current 129 of the current mode switching power supply, as sensed by the current sensor 131.

The switch control circuit 117 may be configured to generate a switch control signal 127 that is configured to close and then open the at least one power switch 101 during each cycle of the periodic clock signal so as to cause the output voltage $V_{OUT}$ (or a scaled version thereof) to be substantially equal to the reference voltage $V_{REF}$. The switch control circuit 117 may be configured to generate a switch control signal 127 that is configured to close the at least one power switch 101 at the beginning of each cycle of the periodic clock signal 114 or at a different time. The switch control circuit 117 may be configured to open the at least one power switch 101 during each cycle when the current through the inductor, as sensed by the current sensor 131, reaches the level indicated by the peak current threshold signal 125, as detected by the current comparator 116.

The slope compensation circuit 119 may be configured to generate a slope compensation signal 120. The peak current threshold circuit 115, in turn, may be configured to modify the peak current threshold signal 125 from what it otherwise would have been in the absence of the slope compensation signal 120 in an amount that is based on the slope compensation signal 120. For example, the peak current threshold circuit 115 may be configured to add, subtract, multiply, or divide the error signal 123 by the slope compensation signal 120.

The slope compensation circuit 119 may be configured to generate a slope compensation signal 120 that provides negative slope compensation that causes the switch control circuit 117 to delay opening the power switch 101 during each cycle of the periodic clock signal in an amount that decreases with increasing duty cycles of the switch control signal. The slope compensation circuit 119 may be configured to generate a slope compensation signal 120 that provides the negative slope compensation only when the duty cycle of the periodic clock signal 114 is less than a threshold. The threshold may be in any amount, such as 50% or 40%.

The slope compensation circuit 119 may be configured to generate a slope compensation signal 120 that provides positive slope compensation when the duty cycle is greater than the threshold that causes the switch control circuit 117 to delay opening the power switch 101 during each cycle of the periodic clock signal in an amount that increases with increasing duty cycles of the switch control signal.

Figure 2:
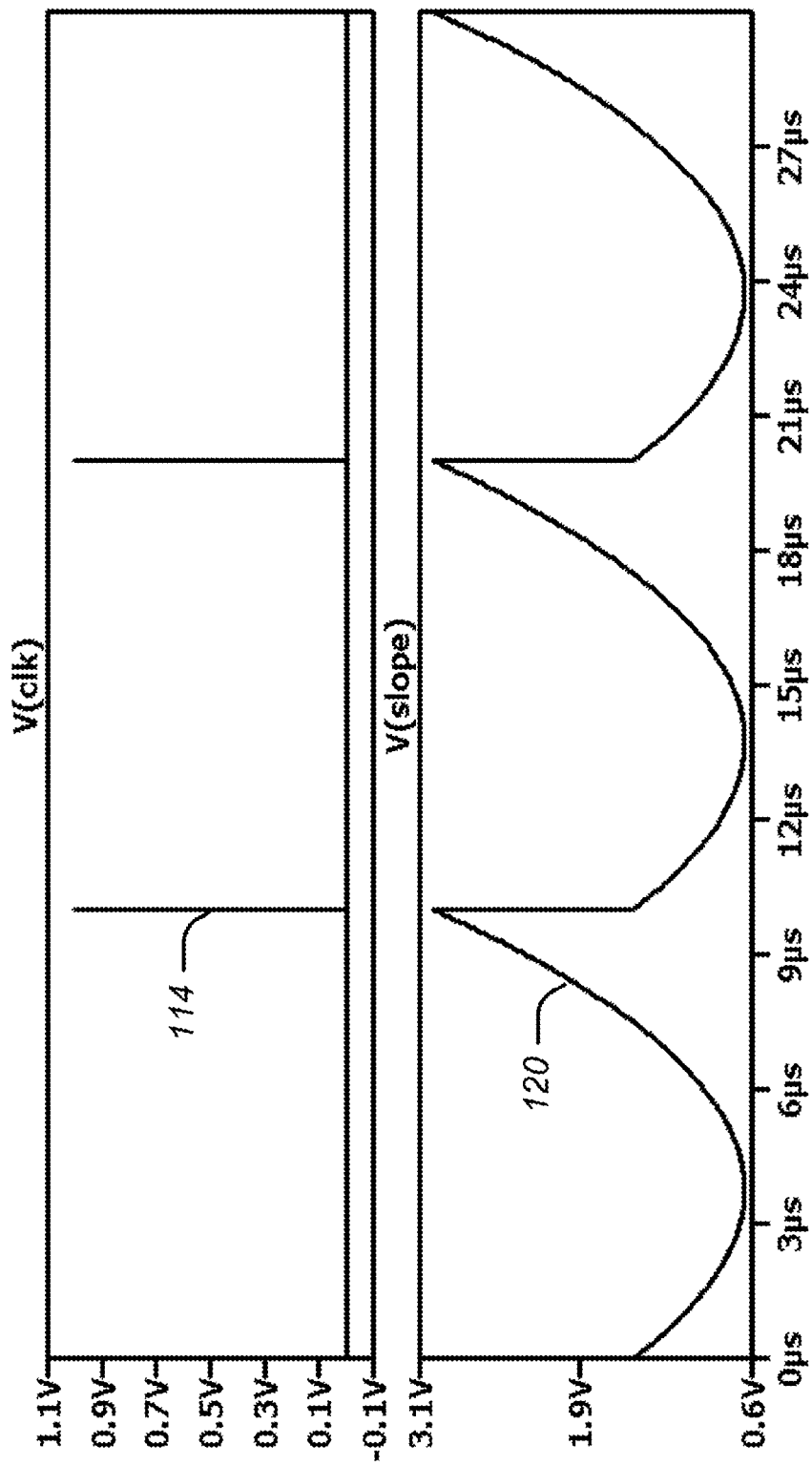
FIG. 2 illustrates an example of the slope compensation signal illustrated in FIG. 1 in conjunction with an example of the periodic clock signal, also illustrated in FIG. 1.

FIG. 2 illustrates an example of the slope compensation signal 120 illustrated in FIG. 1 in conjunction with an example of the periodic clock signal 114, also illustrated in FIG. 1. As illustrated in FIG. 2, the slope compensation signal 120 may be synchronous with the periodic clock signal 114 and may begin by sloping downwardly after the initiation of each clock pulse. At a threshold, such as at approximately 40% of the clock period, the slope compensation signal 120 may slope upwardly until the initiation of the next clock. As illustrated in FIG. 2, the slope compensation signal 120 may approximate the shape of a parabola.

The current mode switching power supply that is illustrated in FIG. 1 may be configured to operate as a peak current mode switching power supply.

Figure 3:
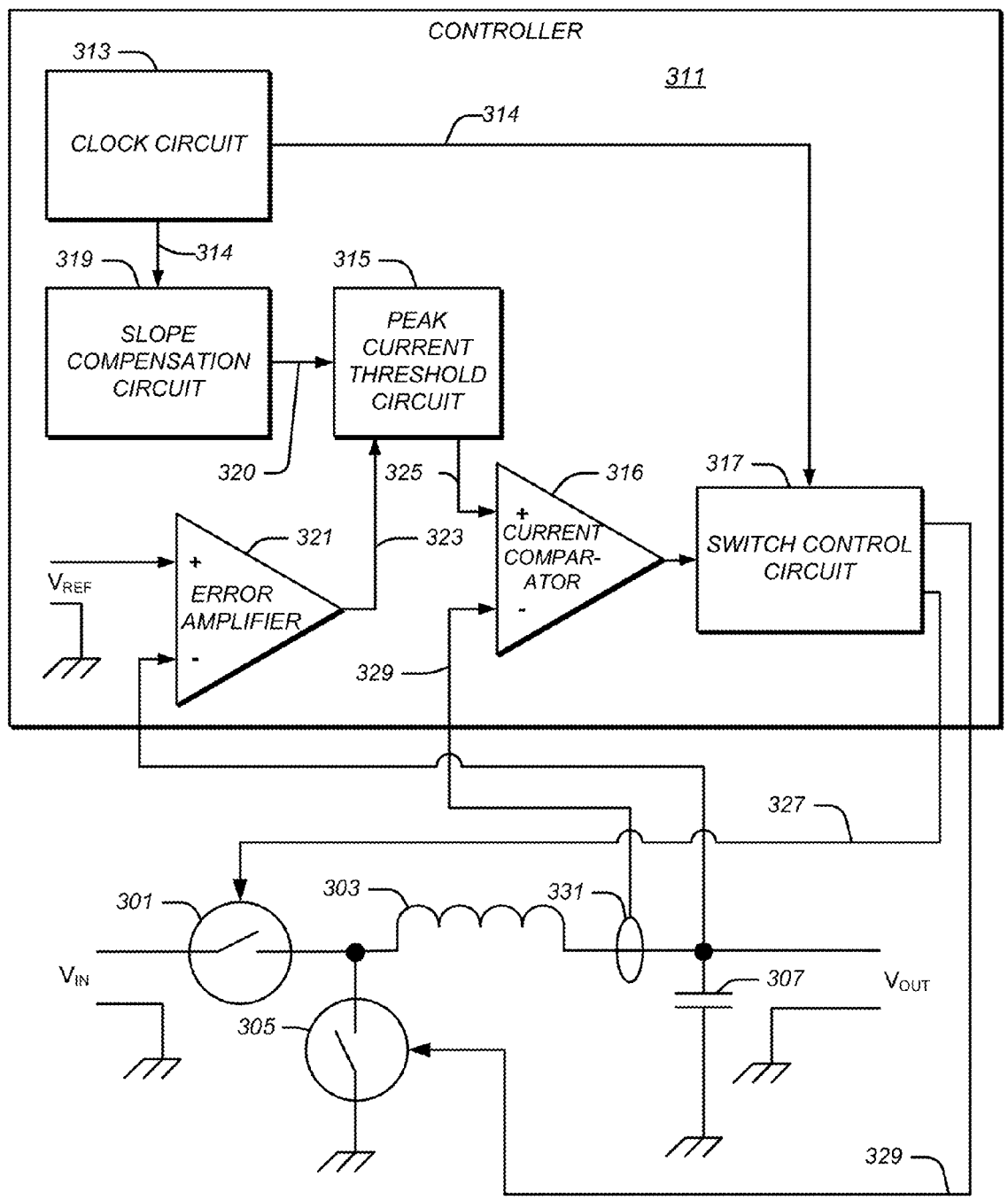
FIG. 3 illustrates an example of a current mode switching power supply that can be configured to operate as a valley current mode switching power supply.

FIG. 3 illustrates an example of a current mode switching power supply that may be configured to operate as a valley current mode switching power supply. Each of its components 301, 303, 307, 311, 313, 315, 316, 317, 321, and 331, and each of the signals 314, 320, 323, 327, and 329 that they generate, respectively, may be the same as the corresponding component or signal that is illustrated in FIG. 1. One difference may be that the rectifier 105 in FIG. 1 is replaced by an electronic switch 305 that may be of the same type as the power switch 101 and that may similarly be driven by a control signal 329 from the switch control circuit 117 that may be complementary to the control signal 327.

Figure 4:
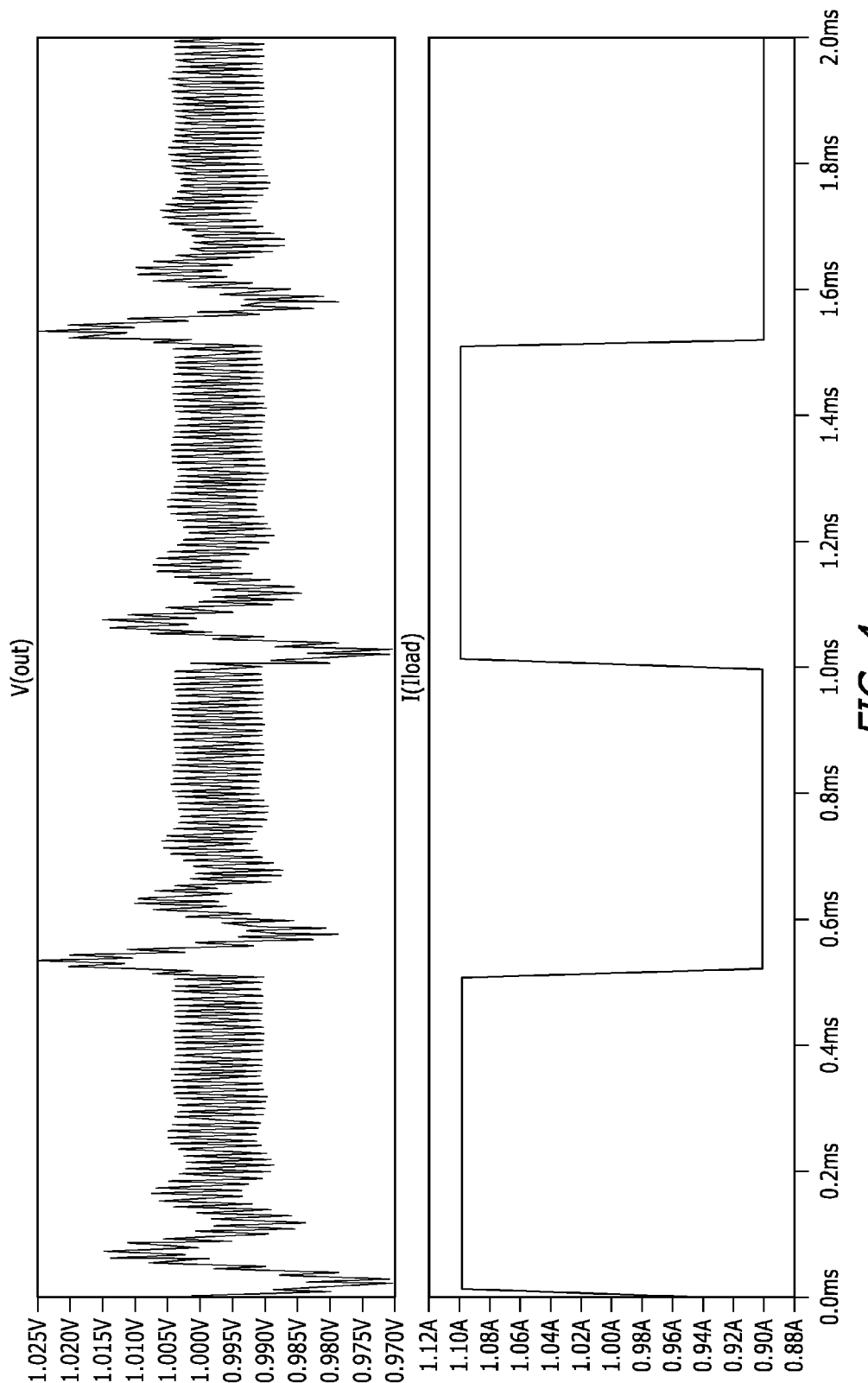
FIG. 4 illustrates an example of a transient response $V_{(vout)}$ that may be produced by a circuit of the type illustrated in FIG. 1 to a stepped load current $I_{(load)}$.

FIG. 4 illustrates an example of a transient response $V_{(vout)}$ that may be produced by a circuit of the type illustrated in FIG. 1 to a stepped load current $I_{(load)}$.

Figure 5:
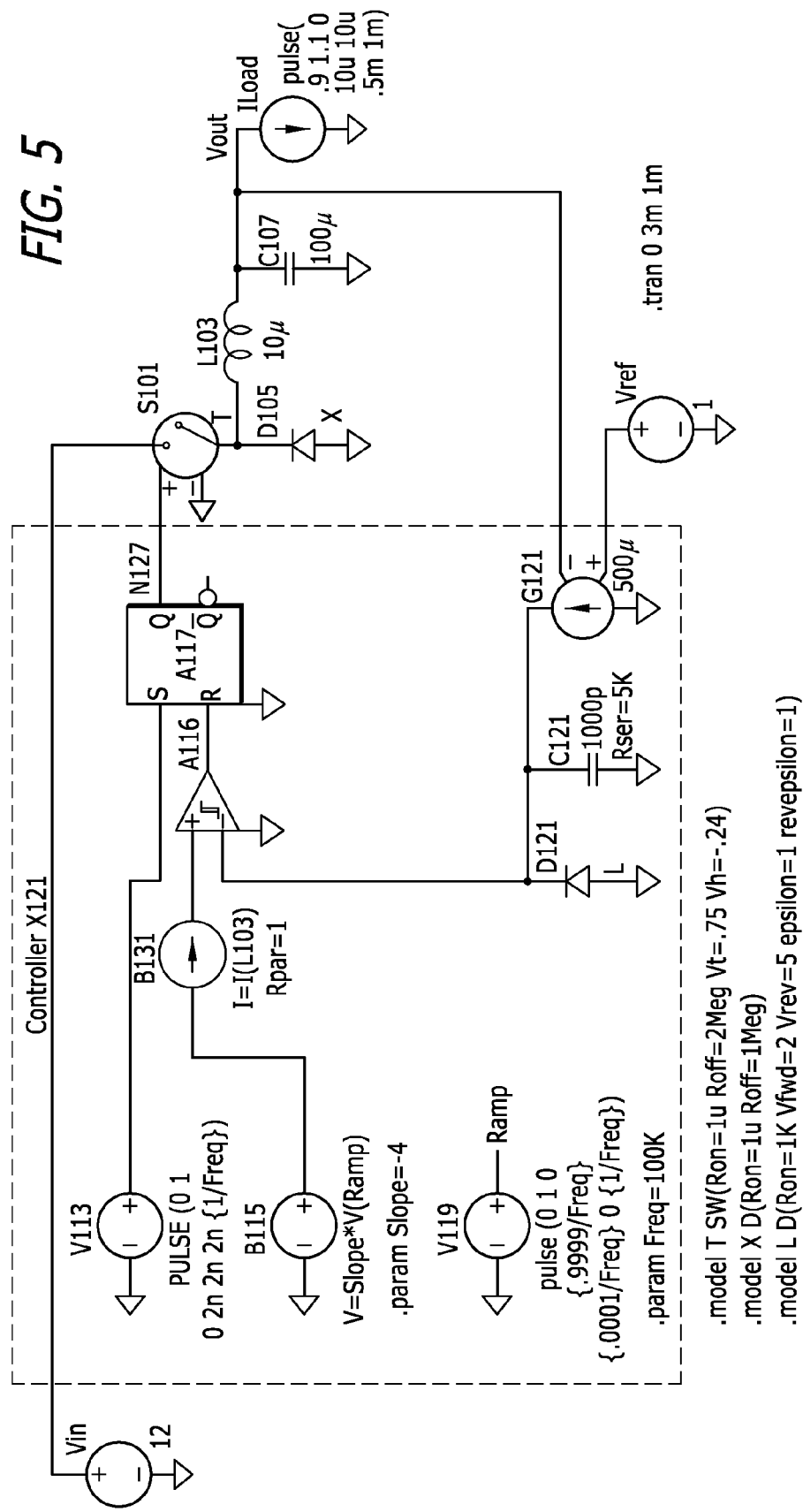
FIG. 5 illustrates a more detailed example of a circuit that may be used to implement the circuit illustrated in FIG. 1.

FIG. 5 illustrates a more detailed example of a circuit that may be used to implement the circuit illustrated in FIG. 1.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the reference voltage $V_{REF}$ may be included in the controller. Also, the slope compensation signal may be injected into the circuit in ways other than into the peak current threshold circuit. For example, it may instead be subtracted from the measured output current 129.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The Abstract is provided to help the reader quickly ascertain the nature of the technical disclosure. It is submitted with the understanding that it will not be used to interpret or limit the scope or meaning of the claims. In addition, various features in the foregoing Detailed Description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

The invention claimed is:

1. A controller for a current mode switching power supply that uses at least one power switch and an inductor to generate an output voltage, the controller comprising:
    a clock circuit configured to generate a periodic clock signal;
    an error amplifier configured to generate an error signal that is representative of a difference between a signal representative of the output voltage and a reference voltage;
    a peak current threshold circuit configured to generate a peak current threshold signal indicative of a peak current that should be reached in the inductor during each cycle of the periodic clock signal that has a level that is based on the error signal;
    a switch control circuit configured to generate a switch control signal that is configured to regulate the voltage output by closing and then opening the at least one power switch during each cycle of the periodic clock signal, the timing of the opening being based on the peak current threshold signal; and
    a slope compensation circuit configured to provide negative slope compensation that causes the switch control circuit to delay opening the at least one power switch during each cycle of the periodic clock signal in an amount that decreases with increasing duty cycles of the switch control signal.

2. The controller of claim 1 wherein the slope compensation circuit is configured to provide the negative slope compensation only when the duty cycle is less than a threshold.

3. The controller of claim 2 wherein the threshold is less than or equal to 50%.

4. The controller of claim 2 wherein the threshold is less than or equal to 40%.

5. The controller of claim 2 wherein the slope compensation circuit is configured to provide positive slope compensation when the duty cycle is greater than the threshold that causes the switch control circuit to delay opening the at least one power switch during each cycle of the periodic clock signal in an amount that increases with increasing duty cycles of the switch control signal.

6. The controller of claim 5 wherein the threshold is less than or equal to 50%.

7. The controller of claim 5 wherein the threshold is less than or equal to 40%.

8. The controller of claim 5 wherein the slope compensation circuit is configured to provide the negative slope compensation when the duty cycle is less than 30%.

9. The controller of claim 5 wherein the slope compensation circuit is configured to generate a signal that approximates the shape of a parabola.

10. The controller of claim 1 wherein the current mode switching power supply is a valley current mode switching power supply.

11. The controller of claim 1 wherein the current mode switching power supply is a peak current mode switching power supply.

12. A regulator for a current mode switching power supply that uses an inductor to generate an output voltage, the regular comprising:
    at least one power switch;
    a clock circuit configured to generate a periodic clock signal;
    an error amplifier configured to generate an error signal that is representative of a difference between a signal representative of the output voltage and a reference voltage;
    a peak current threshold circuit configured to generate a peak current threshold signal indicative of a peak current that should be reached in the inductor during each cycle of the periodic clock signal that has a level that is based on the error signal;
    a switch control circuit configured to generate a switch control signal that is configured to regulate the voltage output by closing and then opening the at least one power switch during each cycle of the periodic clock signal, the timing of the opening being based on the peak current threshold signal; and
    a slope compensation circuit configured to provide negative slope compensation that causes the switch control circuit to delay opening the at least one power switch during each cycle of the periodic clock signal in an amount that decreases with increasing duty cycles of the switch control signal.

13. The controller of claim 12 wherein the slope compensation circuit is configured to provide the negative slope compensation only when the duty cycle is less than a threshold.

14. The controller of claim 13 wherein the threshold is less than or equal to 50%.

15. The controller of claim 13 wherein the threshold is less than or equal to 40%.

16. The controller of claim 13 wherein the slope compensation circuit is configured to provide positive slope compensation when the duty cycle is greater than the threshold that causes the switch control circuit to delay opening the at least one power switch during each cycle of the periodic clock signal in an amount that increases with increasing duty cycles of the switch control signal.

17. The controller of claim 16 wherein the threshold is less than or equal to 50%.

18. The controller of claim 16 wherein the threshold is less than or equal to 40%.

19. The controller of claim 16 wherein the slope compensation circuit is configured to provide the negative slope compensation when the duty cycle is less than 30%.

20. The controller of claim 16 wherein the slope compensation circuit is configured to generate a signal that is approximately in the shape of a parabola.

21. The controller of claim 1 wherein the current mode switching power supply is a valley current mode switching power supply.

22. The controller of claim 1 wherein the current mode switching power supply is a peak current mode switching power supply.

* * * * *